United States Patent [19]

Ryu

[11] Patent Number: 5,138,510
[45] Date of Patent: Aug. 11, 1992

[54] FLAP OF VIDEO TAPE CASSETTE AND ITS INSTALLING STRUCTURE

[75] Inventor: Su S. Ryu, Chungnam, Rep. of Korea

[73] Assignee: SKC Limited, Kyungki, Rep. of Korea

[21] Appl. No.: 561,714

[22] Filed: Aug. 1, 1990

[30] Foreign Application Priority Data

Aug. 18, 1989 [KR] Rep. of Korea ............... 89-11765

[51] Int. Cl.$^5$ .............. G11B 15/32; G11B 15/60; G11B 23/02
[52] U.S. Cl. .................. 360/132; 360/130.21; 360/130.3; 242/199
[58] Field of Search ........... 360/132, 130.21, 130.3, 360/130.31, 130.32, 130.33; 249/199

[56] References Cited

U.S. PATENT DOCUMENTS

| | | | |
|---|---|---|---|
| 3,797,779 | 3/1974 | Esashi et al. | 242/199 |
| 4,304,374 | 12/1981 | Okamura et al. | 242/199 |
| 4,342,436 | 8/1982 | Oyama et al. | 242/199 |
| 4,405,097 | 9/1983 | Gebeke | 242/199 |
| 4,463,918 | 8/1984 | Takagi | 242/199 |
| 4,509,087 | 4/1985 | Jager et al. | 360/132 X |
| 4,518,135 | 5/1985 | Gebeke | 242/199 |
| 4,569,492 | 2/1986 | Gelardi et al. | 242/199 |
| 4,598,329 | 7/1986 | Nelson | 360/130.21 |
| 4,606,513 | 8/1986 | Gelardi et al. | 242/199 |
| 4,625,252 | 11/1986 | Balz et al. | 360/130.21 |

FOREIGN PATENT DOCUMENTS 3443995 6/1986 Fed. Rep. of Germany ...... 360/132

*Primary Examiner*—John H. Wolff
*Attorney, Agent, or Firm*—Ladas & Parry

[57] ABSTRACT

The present invention relates to a flap which applies elastic pressure to the tape which runs in a Video Tape Cassette and its installing structure.

The flap is formed by coating its both sides which use a PET(Polyethylene Terephthalate) film as the base with a composite containing a carbon black lubricant and a fitting method is adopted to install the flap.

6 Claims, 3 Drawing Sheets

FLAP OF VIDEO TAPE CASSETTE AND ITS INSTALLING STRUCTURE

BACKGROUND OF THE INVENTION

1. Field of the Invention

The present invention relates to a flap which applies elastic pressure to the tape which runs in a video tape cassette and its installing structure.

The flap is formed by coating both sides using a PET(Polyethylene Terephthalate) film as the base, with a composite containing a carbon black lubricant and a fitting method is adopted to install the flap.

2. Brief Description of the Prior Art

Generally, the flap which is applied to a video cassette tape is a thin elastic piece which is installed to prevent various problems caused when the tape runs loosely, by applying elastic pressure thereto.

It elastically supports the tape which runs between the flap and a pressing/supporting part on the other side of the flap and then over a tape guide roller. One side of the flap is attached to the front wall on the supply side of tape cassette about halfway down, and its other side is supported adjacent tape guide roller. Such a conventional flap(23) is formed by attaching at one end a two-sided adhesive tape(21), to one side of PET film (20), and a separate pressing/supporting tape (22) mixed with polyethylene (PE) and carbon black, or made of teflon, to the other end.

The flap formed in such a manner is fixedly attached to the front wall by using the said two-sided adhesive tape, as illustrated in FIG. 6.

The conventional flap formed in such a manner as described hereinbefore involves a problem in that it lowers productivity and thereby causes a rise in production costs, because 1) a separate pressing/supporting tape (22) must be formed with a grid-shaped or variously shaped embossed part on its outer face to prevent static electricity from being generated by friction, the shape face minimizing the area of contact with the video tape in the pressing/supporting part; and 2) the two-sided adhesive tape it uses is attached deviating from the correct position if a condition is changed only a little in the automatic production line. In such a case, the adhesive strength weakens, thereby causing the flap not to exercise its proper function in the case where it is used for a long time or under high-temperature conditions, even if it is attached to the correct position.

The Japanese Patent Journal Showa No. 55-14665 and the Japanese Utility Model Journals Showa No. 56-51185, No. 59-194184 and No. 62-106375 are known as prior art in which the fixing part on one side of the body of the tape cassette is extended and bent, or a fixing piece is made by stamping out a certain portion of the fixing part, and then a flap is installed by catching it in the fixing part, as a means to solve such a problem. These are not as good as expected for the reason that the fixed condition is not secure and the structure is complicated, and the life span is short even if the structure were simple.

BRIEF DESCRIPTION OF THE PRESENT INVENTION

The present invention aims to solve such a problem as stated hereinabove. It forms the body of flap not into a double-combined body but into a single body, and, in order to perform the function of compressing tape, it coats the PET film with a composite containing a vinyl binder, a polyester or polyurethane binder and a carbon black lubricant and makes the conventional pressing-/supporting tape unnecessary. This reduces the number of parts, improves productivity and curtails production costs by simplifying a process of production.

On the other hand, the invention aims to make fitting convenient by not using a two-sided adhesive tape, but by adopting a fitting method and improving quality and reliability by establishing its structure firmly.

The object of the present invention can be accomplished if, in forming a video tape cassette flap, it is formed so as to cause the pressing/supporting layer coated on both sides or on one side of its body which uses a PET film as the base with a composite containing a vinyl binder a polyester or polyurethane binder and a carbon black lubricant the thickness of about 2.5 μm coated on its surface. And if, in installing such a flap, one side thereof is made of a catching piece which acts as a hinge part by stamping out a certain portion of its body, the rear side of the hinge part being made of an installing piece so that it may be closely attached to and supported by one supporting rib formed in the front wall on the supply side of the tape cassette body, and the end of the catching piece is made so it is caught by another supporting rib.

Also, in installing such a flap, a catching piece which has one of its sides a hinge part is formed by stamping out a certain portion of its body, but a bending part is formed in the catching piece and it is made to be fixed to a fixing rib formed in the front wall on the supply side of the tape cassette body by making the rear side of the hinge part an installing piece. And the end of the catching piece is made so it is caught by a supporting rib, or the flap is made to be fixed to a supporting rib and a fixing rib, which are formed in the front wall on the supply side of the tape cassette body, but the end of the catching part is made to be caught by another supporting rib, while the installing piece is closely supported by the supporting rib, and the bending part of the catching piece is made to be inserted between the supporting rib and the fixing rib, or the catching piece which makes its one side a hinge part by stamping out a certain portion of its body, and the rear side thereof is formed but the catching piece is made to be fixed into an inclined chipped groove of the supporting rib formed in the front wall on the supply side of the tape cassette body.

The aforesaid flap does not require a separate pressing/supporting part and its body functions as a pressing-/supporting part. It is by reason that the pressing/supporting part formed of a composite containing oxidized steel magnetic materials, such as vinyl binder, polyester or polyurethane binder and carbon black, is coated on both sides of its body, and thus the body is elastically supported adjacent the tape guide roller and the tape is thereby prevented from running between the flap body and the tape guide roller, and also from being pushed up or down.

DETAILED DESCRIPTION OF THE PREFERRED EMBODIMENTS

The embodiment of the present invention will now be described according to the drawings attached hereto.

Figure 1:
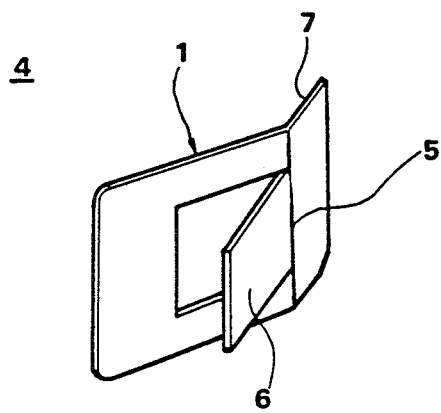
FIG. 1 is a perspective view of the present invention.
Figure 2:
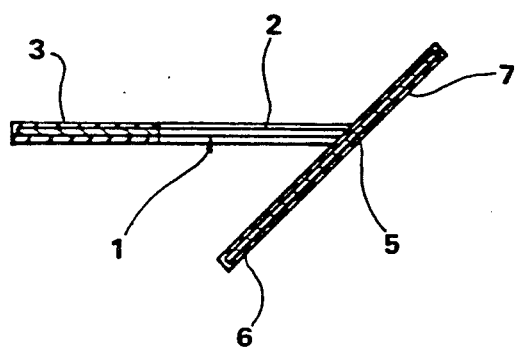
FIG. 2 is a schematic diagram showing the cross section of FIG. 1.

FIG. 1 is a perspective view of the flap based on the present invention and FIG. 2 is a schematic diagram showing the cross section of FIG. 1.

Figure 3:
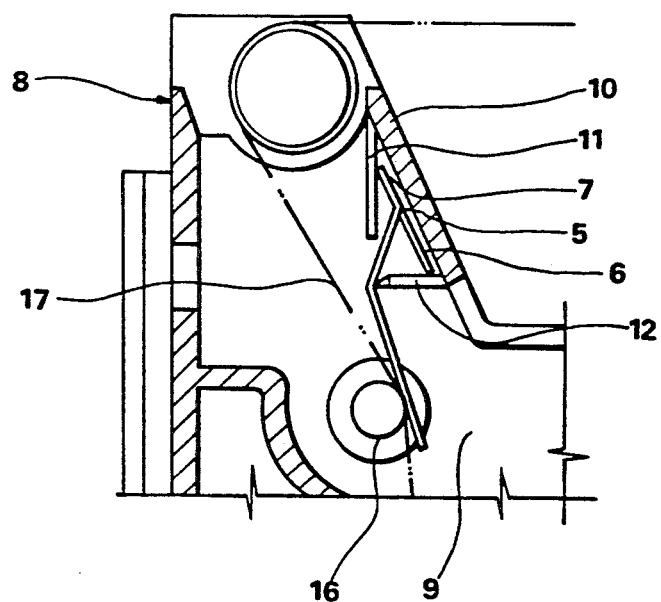
FIG. 3 is a plane view of the important part of a tape cassette body showing the structure in which the present invention is installed.

A flap(4) is made by forming a pressing/supporting layer(3) coated with a composite containing a vinyl binder, a polyester or polyurethane binder and a carbon black lubricant the thickness of about 2.5 μm on both sides of its body, which uses a PET film (1), as the base and the said flap(4), forms a catching piece (6), which makes its one side a hinge part(5), by stamping out a certain portion of its body(2), but the rear side of hinge part (5) is made of an installing piece(7), and such a flap(4) is made to be fixed to the supporting ribs (11) and (12) (FIG. 3), formed in the front wall(10), on the supply side(9) of a tape cassette body (8), but the end of catching piece(6) is made so it is caught by the supporting rib(12).

Figure 4A:
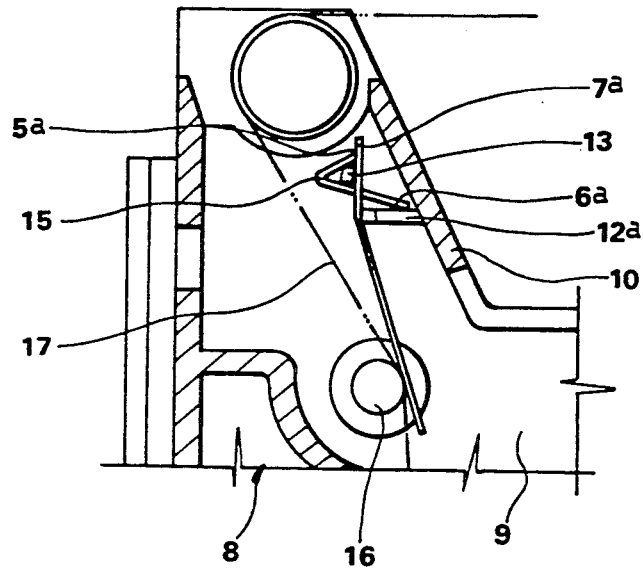
FIG. 4A, 4B and 4C are plane views of the other structures in which the present invention is installed.
Figure 4B:
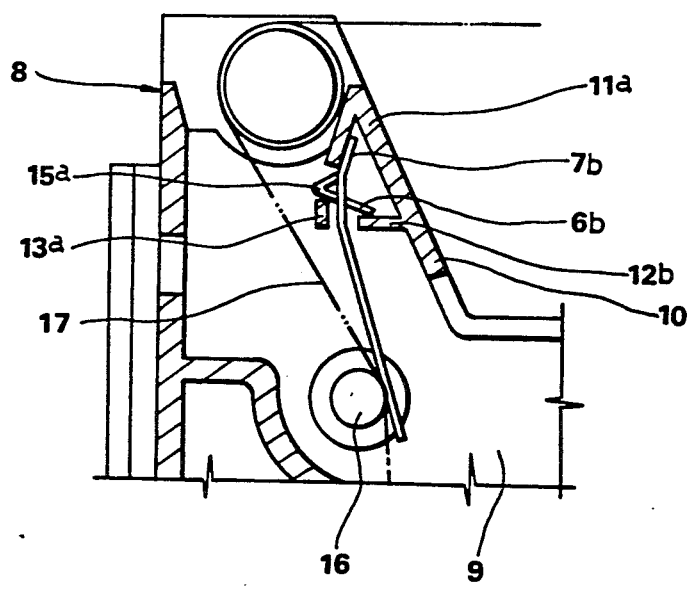

FIG. 4A shows another installing structure based on the present invention.

A catching piece(6a) which has on one side a hinged part (5a) is formed by stamping out a certain portion of the body (2) of the flap(4), but a bending part(15) is formed in the catching piece(6a) and the rear side of the hinged part(5a) is made of an installing piece(7a) so as to be fixed to the fixing rib(13) and the supporting rib(12a) which are formed in the front wall (10) on the supply side(9) of the tape cassette body(8); but the bending part(15) of the catching piece(6a) is made to be fixed to the fixing rib (13) and the end of the catching piece(6a) is made to be caught by the supporting rib(12a).

In FIG. 4A the said flap(4) is made to be fixed to the supporting ribs(11a) ( b) and the fixing rib 13a), which are formed in the front wall(10) but the end of the catching piece(6b) is made so it is caught by supporting rib(12b) with an installing piece(7b) being closely supported by the supporting rib(11a) and the bending part(-15a) of the catching piece(6a) is made to be inserted between the supporting rib(11a) and the fixing rib(13a).

Figure 4C:
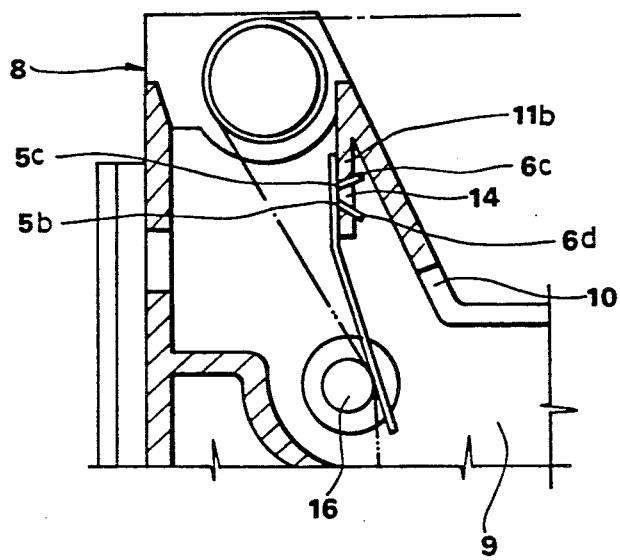
Figure 5:
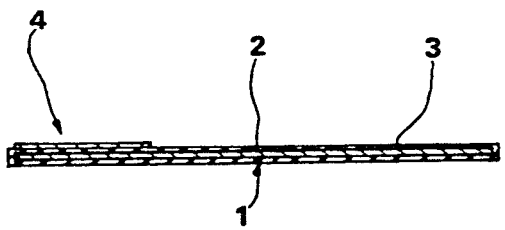
FIG. 5 is a schematic diagram showing the construction of the present invention by applying a conventional flap to it.
Figure 6:
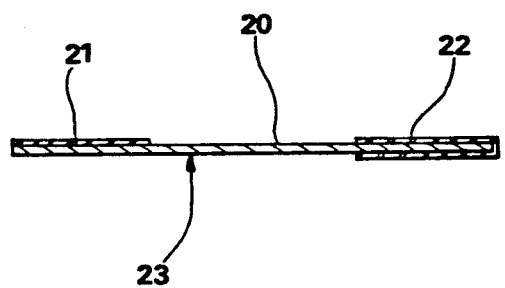
FIG. 6 is a schematic diagram showing the cross section of a conventional flap.

FIG. 4C shows that catching pieces(6c) and (6d), which have hinged parts(5b) and (5c), are formed by stamping out a certain portion of the body(2), of flap(4), and the rear side thereof and the catching pieces(6c) and (6d) are thereby made to be inserted into the inclined chipped groove(14) of the supporting rib(11b) formed in the front wall(10).

The aforesaid present invention has the effect of improving productivity and curtailing production costs by reason that it reduces the number of parts and accordingly shortens the length of its production process, rendering the conventional pressing/supporting tape unnecessary, by not being formed into a double-combined body but into a single body. Likewise, it also has the effect of improving quality and reliability by reason that its fitting is convenient and can be fixed correctly and firmly.

I claim:

1. A flap for use in a tape cassette, comprising:
    a body formed of a polyethylene terephthalate film base; and
    a coating on said body having a thickness of about 2.5 μm, said coating including a composite containing a vinyl binder, a polyester or polyurethane binder, and a carbon black lubricant on at least one side of said body.

2. The flap as claimed in claim 1, wherein said body is a single piece strip comprising:
    a free end for pressing a tape in said cassette against a tape guide;
    a mounting end, opposite said free end, for fixing said flap to a flap supporting means in said cassette, said mounting end being bent relative to said free end to form a hinge line at the bend; and
    an intermediate tab portion formed in said free end by stamping a U-shaped cutout therein beginning and ending at said hinge line, said tab portion being bent out of the plane of said free end; whereby
    said flap is mounted in said cassette by engagement of said mounting end and said tab portion with the cassette flap supporting means.

3. The flap as claimed in claim 2, wherein the cassette supporting means includes a pair of ribs projecting from an interior wall of the cassette, and said mounting end is supported by one of the ribs and said tab portion is supported by the other of said ribs.

4. The flap as claimed in claim 2, wherein the cassette supporting means includes a pair of ribs projecting from an interior wall of the cassette, and said tab portion is bent at a location spaced from said hinge line to form a knee portion, one of said ribs being captured under said knee portion, and the free end of said tab portion being supported by the other of said ribs.

5. The flap as claimed in claim 2, wherein:
    the cassette sporting means includes three ribs projecting from an interior wall of the cassette;
    said tab portion is bent at a location spaced from said hinge line to form a knee portion;
    said mounting end is supported by a first one of said ribs;
    said knee portion projects into a space between said first rib and a second one of said ribs; and
    the free end of said tab portion is supported by the third one of said ribs.

6. The flap as claimed in claim 1, wherein said body is a single piece strip comprising:
    a free end for pressing a tape in said cassette against a tape guide;
    a mounting end, opposite said free end, for fixing said flap to a flap supporting means in said cassette, the flap supporting means including a rib projecting from an interior wall of the cassette, the wall having an inclined slotted groove therein with inclined sidewalls, said mounting end comprising a pair of tabs formed by stamping two U-shaped cutouts therein each beginning and ending at a hinge line and being bent out of the plane of said mounting end of said strip, said tabs being supported by said inclined sidewalls of said slotted groove.

* * * * *